US012628179B2

(12) United States Patent
Zhu

(10) Patent No.: US 12,628,179 B2
(45) Date of Patent: May 12, 2026

(54) ACTIVATION INDICATION METHOD AND APPARATUS, AND ACTIVATION DETERMINATION METHOD AND APPARATUS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 18/032,563

(22) PCT Filed: Oct. 19, 2020

(86) PCT No.: PCT/CN2020/121831
§ 371 (c)(1),
(2) Date: Apr. 18, 2023

(87) PCT Pub. No.: WO2022/082349
PCT Pub. Date: Apr. 28, 2022

(65) Prior Publication Data
US 2023/0397223 A1 Dec. 7, 2023

(51) Int. Cl.
*H04W 72/232* (2023.01)

(52) U.S. Cl.
CPC .................................. *H04W 72/232* (2023.01)

(58) Field of Classification Search
CPC .... H04W 72/232; H04L 5/001; H04L 5/0098; Y02D 30/70
See application file for complete search history.

(56) References Cited

U.S. PATENT DOCUMENTS

| | | | |
|---|---|---|---|
| 2014/0086127 A1* | 3/2014 | Kim | ........................ H04L 5/001 370/311 |
| 2014/0177500 A1* | 6/2014 | Han | ..................... H04W 52/50 370/311 |
| 2015/0071198 A1 | 3/2015 | Deng | |
| 2016/0270107 A1 | 9/2016 | Dinan | |
| 2019/0045491 A1 | 2/2019 | Zhang et al. | |
| 2019/0124558 A1* | 4/2019 | Ang | ........................ H04L 5/001 |
| 2019/0222349 A1 | 7/2019 | Gao et al. | |
| 2020/0245249 A1* | 7/2020 | Medles | ................. H04W 72/23 |
| 2021/0029772 A1* | 1/2021 | Islam | .................... H04L 1/1896 |

(Continued)

FOREIGN PATENT DOCUMENTS

| | | |
|---|---|---|
| CN | 102149208 A | 8/2011 |
| CN | 102577209 A | 7/2012 |

(Continued)

OTHER PUBLICATIONS

CMCC, "Discussion on fast activation and deactivation of Scell", 3GPP TSG RAN WG1 #97 R1-1906528, Reno, USA, May 17, 2019, (3p). (Year: 2019).*

(Continued)

*Primary Examiner* — Noel R Beharry
*Assistant Examiner* — Phillip J Kearns
(74) *Attorney, Agent, or Firm* — Arch & Lake LLP

(57) ABSTRACT

An activation indication method includes: sending, by a base station, downlink control information (DCI) to a terminal, wherein the DCI is used for indicating the terminal to activate and/or deactivate a secondary cell (SCell).

18 Claims, 6 Drawing Sheets

(56) References Cited

U.S. PATENT DOCUMENTS

| | | | | |
|---|---|---|---|---|
| 2021/0120464 A1* | 4/2021 | Shen | .................... | H04L 5/0053 |
| 2023/0217506 A1* | 7/2023 | Löhr | ................ | H04W 52/0216 |
| | | | | 370/329 |

FOREIGN PATENT DOCUMENTS

| | | | | | |
|---|---|---|---|---|---|
| CN | 109644352 A | 4/2019 | | | |
| CN | 111106912 A | 5/2020 | | | |
| CN | 111194074 A | 5/2020 | | | |
| CN | 111225396 A | 6/2020 | | | |
| CN | 111264042 A | 6/2020 | | | |
| WO | WO-2011063244 A2 * | 5/2011 | ........... | H04W 72/23 | |
| WO | 2019127035 A1 | 7/2019 | | | |
| WO | 2020067811 A1 | 4/2020 | | | |

OTHER PUBLICATIONS

International Search Report of PCT/CN2020/121831 dated Jul. 15, 2021 with English translation, (4p).

CMCC, "Discussion on fast activation and deactivation of Scell", 3GPP TSG RAN WG1 #97 R1-1906528, Reno, USA, May 17, 2019, (3p).

First Office Action issued to Chinese Application No. 202080002735.1 dated Dec. 26, 2024 with English translation, (17p).

Huawei, HiSilicon, "Discussion on low latency SCell activation and efficient SCell management", 3GPP TSG RAN WG1 #99, R1-1911875, Reno, USA, Nov. 18-22, 2019, (13p).

Interdigital, Inc., "SCell activation/deactivation in NR", 3GPP TSG RAN WG1 Meeting 91, R1-1720557, Reno, USA, Nov. 27-Dec. 1, 2017, (2p).

Vivo, "Start the Scell deactivation timer", 3GPP TSG-RAN WG2 Meeting#102, R2-1807575, Busan, Korea, May 21-25, 2018, (2p).

Ericsson, "Summary of efficient and low latency serving cell configuration/activation/setup", 3GPP TSG-RAN WG1 #99, R1-1913270, Reno, USA, Nov. 18-22, 2019, (22p).

Qualcomm Incorporated, "Discussion on fast SCell activation based on Aperiodic TRS (ATRS)", 3GPP TSG RAN WG2 Meeting #107, R2-1908686 (Update of R2-1906461), Prague, Czech, Aug. 26-30, 2019, (5p).

CNOA issued in Application No. 202080002735.1 dated May 1, 2025 with English translation, (11p).

* cited by examiner

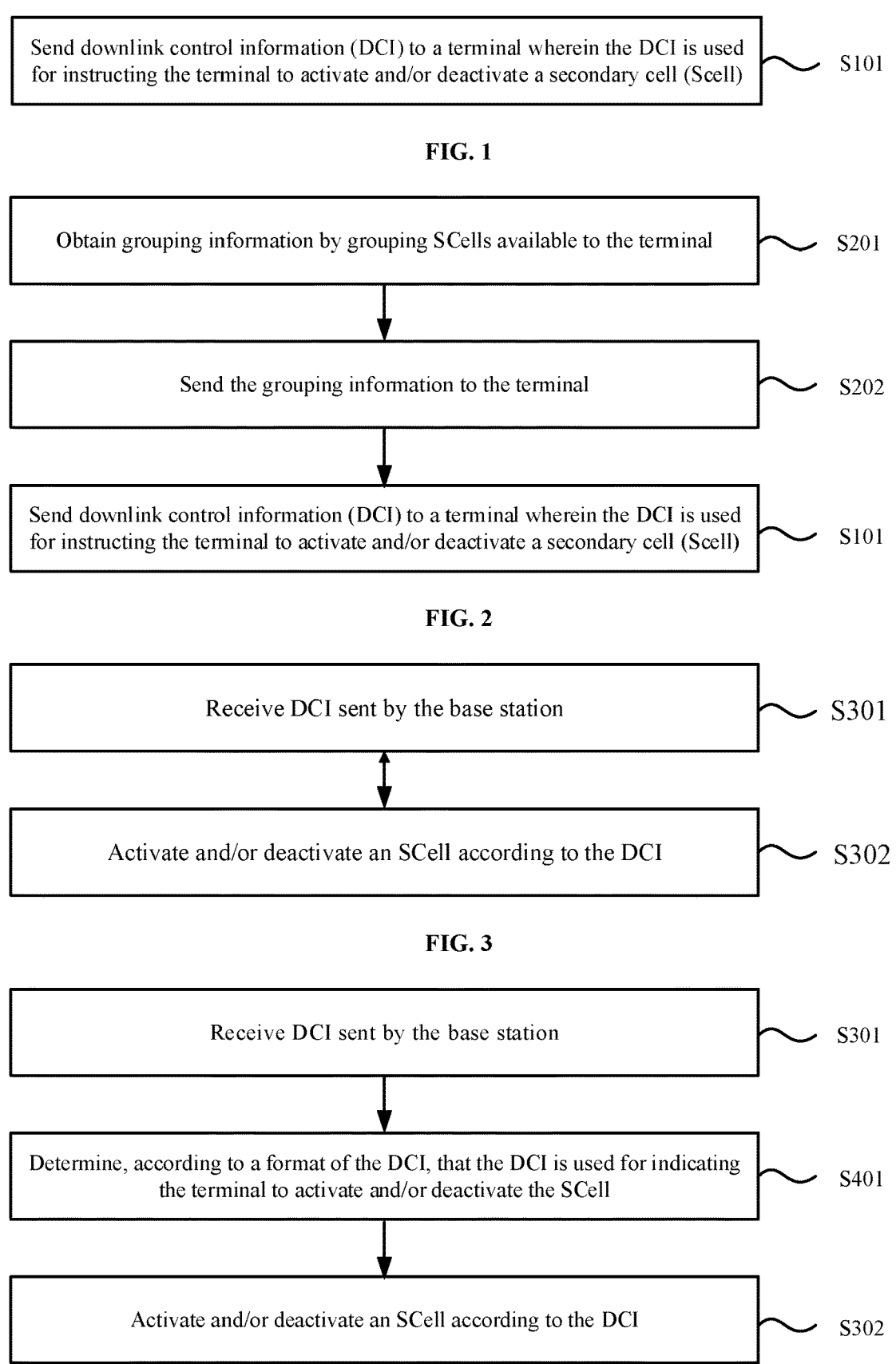

Send downlink control information (DCI) to a terminal wherein the DCI is used for instructing the terminal to activate and/or deactivate a secondary cell (Scell)          S101

FIG. 1

Obtain grouping information by grouping SCells available to the terminal          S201

Send the grouping information to the terminal          S202

Send downlink control information (DCI) to a terminal wherein the DCI is used for instructing the terminal to activate and/or deactivate a secondary cell (Scell)          S101

FIG. 2

Receive DCI sent by the base station          S301

Activate and/or deactivate an SCell according to the DCI          S302

FIG. 3

Receive DCI sent by the base station          S301

Determine, according to a format of the DCI, that the DCI is used for indicating the terminal to activate and/or deactivate the SCell          S401

Activate and/or deactivate an SCell according to the DCI          S302

FIG. 4

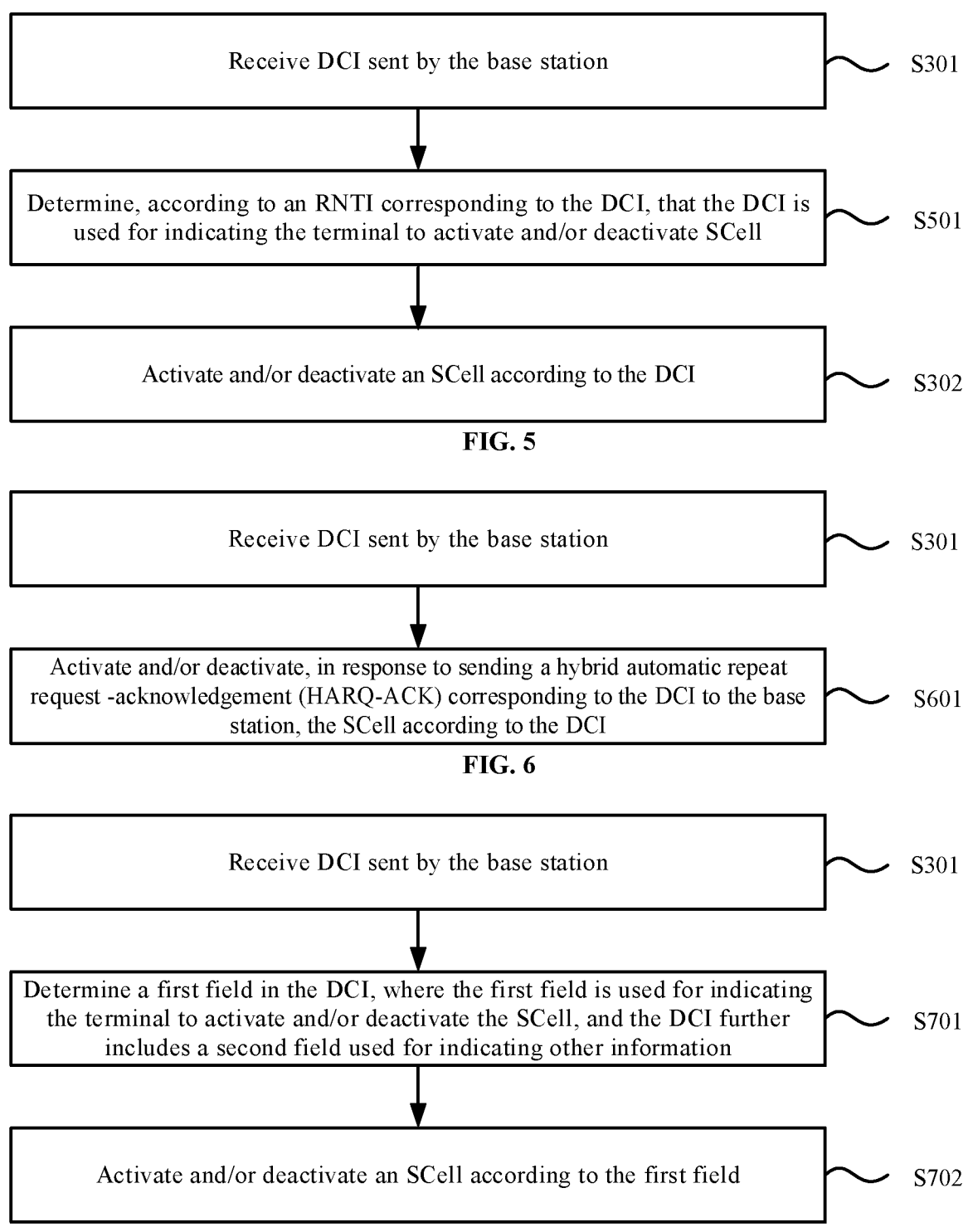

Receive DCI sent by the base station — S301

Determine, according to an RNTI corresponding to the DCI, that the DCI is used for indicating the terminal to activate and/or deactivate SCell — S501

Activate and/or deactivate an SCell according to the DCI — S302

FIG. 5

Receive DCI sent by the base station — S301

Activate and/or deactivate, in response to sending a hybrid automatic repeat request -acknowledgement (HARQ-ACK) corresponding to the DCI to the base station, the SCell according to the DCI — S601

FIG. 6

Receive DCI sent by the base station — S301

Determine a first field in the DCI, where the first field is used for indicating the terminal to activate and/or deactivate the SCell, and the DCI further includes a second field used for indicating other information — S701

Activate and/or deactivate an SCell according to the first field — S702

FIG. 7

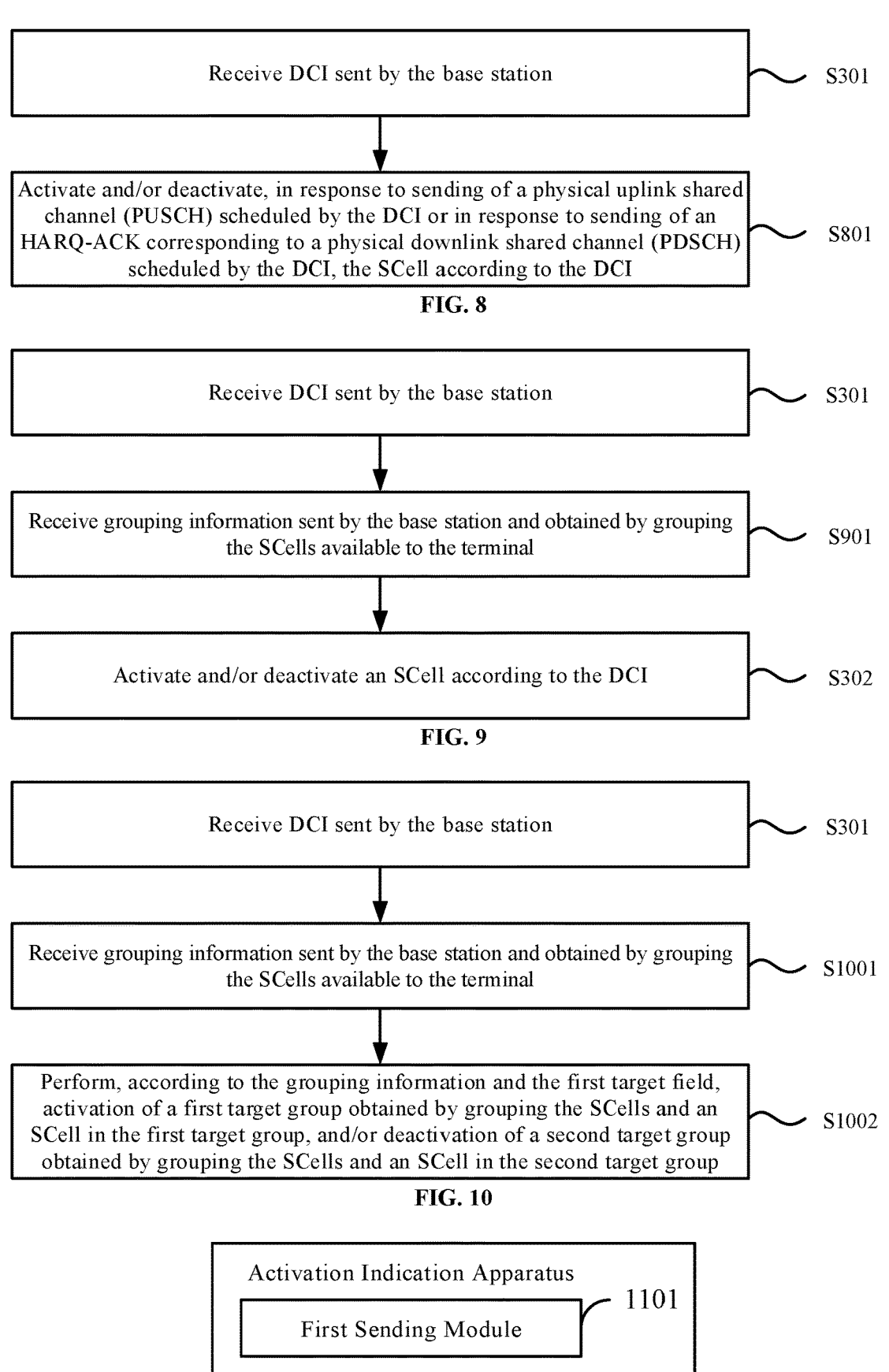

Receive DCI sent by the base station — S301

Activate and/or deactivate, in response to sending of a physical uplink shared channel (PUSCH) scheduled by the DCI or in response to sending of an HARQ-ACK corresponding to a physical downlink shared channel (PDSCH) scheduled by the DCI, the SCell according to the DCI — S801

FIG. 8

Receive DCI sent by the base station — S301

Receive grouping information sent by the base station and obtained by grouping the SCells available to the terminal — S901

Activate and/or deactivate an SCell according to the DCI — S302

FIG. 9

Receive DCI sent by the base station — S301

Receive grouping information sent by the base station and obtained by grouping the SCells available to the terminal — S1001

Perform, according to the grouping information and the first target field, activation of a first target group obtained by grouping the SCells and an SCell in the first target group, and/or deactivation of a second target group obtained by grouping the SCells and an SCell in the second target group — S1002

FIG. 10

Activation Indication Apparatus

First Sending Module — 1101

FIG. 11

ACTIVATION INDICATION METHOD AND APPARATUS, AND ACTIVATION DETERMINATION METHOD AND APPARATUS

CROSS REFERENCE TO RELATED APPLICATION

This application is a National Stage of International Application No. PCT/CN2020/121831, filed on Oct. 19, 2020, which is incorporated by reference herein in its entireties for all purposes.

BACKGROUND

Carrier aggregation (CA) technology can be used to aggregate multiple component carriers (CCs) together, thereby effectively increasing the system bandwidth and network capacity, so as to provide effective support for high-speed data transmission. Currently, the aggregation of up to 16 CCs can be supported. In the case of CA, the terminal can send and receive data on multiple CCs at the same time.

In 5G new radio (NR), a CC may also be called a cell. In 5G NR, dual connectivity (DC) technology is introduced. Based on the DC technology, a terminal can remain links with two base stations, and one of the two base stations with which the terminal remain the link is the master station and the other one is the secondary station. All CCs belonging to the master station form a group (referred to as MCG), and all CCs belonging to the secondary station form a group (referred to as SCG). In the CA/DC scenario, the anchor carrier corresponding to MCG is called primary cell (PCell), the anchor carrier corresponding to SCG is called primary secondary cell (PSCell), and the other carriers are called secondary cell (SCell).

SUMMARY

This disclosure relates to the field of communication technologies, and in particular, to an activation indication method, an activation determination method, an activation indication apparatus, an activation determination apparatus, an electronic device, and a computer-readable storage medium.

According to a first aspect of the embodiments of this disclosure, an activation indication method is proposed, which is applicable to a base station and includes:

sending downlink control information (DCI) to a terminal, where the DCI is used for indicating the terminal to activate and/or deactivate a secondary cell (SCell).

According to a second aspect of the embodiments of this disclosure, an activation determination method is provided, which is applicable to a terminal and includes:

receiving DCI sent by a base station; and performing activation and/or deactivation of an SCell according to the DCI.

According to a fifth aspect of the embodiments of this disclosure, an electronic device is provided, including:

a processor; and a memory for storing instructions executable by the processor;

where the processor is configured to implement the activation indication method as described above.

According to a sixth aspect of the embodiments of this disclosure, an electronic device is provided, including:

a processor; and a memory for storing instructions executable by the processor;

where the processor is configured to implement the activation determination method as described above.

BRIEF DESCRIPTION OF THE DRAWINGS

In order to illustrate the technical solutions according to some embodiments of this disclosure more clearly, the following briefly introduces the accompanying drawings used in the description of the embodiments. Obviously, the accompanying drawings in the following description are only some embodiments of this disclosure. For those of ordinary skill in the art, other drawings can also be obtained from these drawings without creative efforts.

FIG. 1 is a schematic flowchart of an activation indication method according to some embodiments of this disclosure.

FIG. 2 is a schematic flowchart of another activation indication method according to some embodiments of this disclosure.

FIG. 3 is a schematic flowchart of an activation determination method according to some embodiments of this disclosure.

FIG. 4 is a schematic flowchart of another activation determination method according to some embodiments of this disclosure.

FIG. 5 is a schematic flowchart of yet another activation determination method according to some embodiments of this disclosure.

FIG. 6 is a schematic flowchart of yet another activation determination method according to some embodiments of this disclosure.

FIG. 7 is a schematic flowchart of yet another activation determination method according to some embodiments of this disclosure.

FIG. 8 is a schematic flowchart of yet another activation determination method according to some embodiments of this disclosure.

FIG. 9 is a schematic flowchart of yet another activation determination method according to some embodiments of this disclosure.

FIG. 10 is a schematic flowchart of yet another activation determination method according to some embodiments of this disclosure.

FIG. 11 is a block diagram of an activation indication apparatus according to some embodiments of this disclosure.

DETAILED DESCRIPTION

Figure 12:
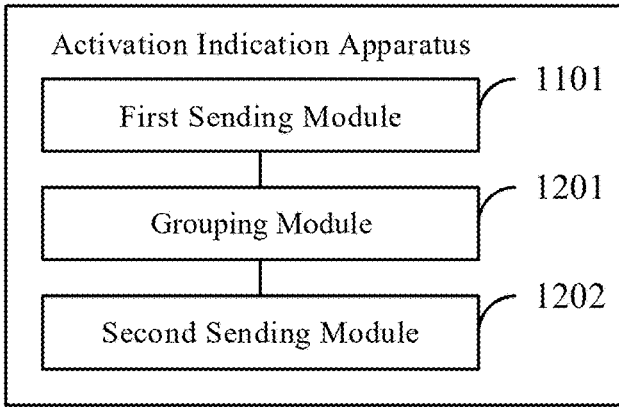
FIG. 12 is a block diagram of another activation indication apparatus according to some embodiments of this disclosure.

The technical solutions in some embodiments of this disclosure will be clearly and completely described below with reference to the accompanying drawings according to some embodiments of this disclosure. Obviously, the described embodiments are only a part of the embodiments of this disclosure, but not all of them. Based on the embodiments in this disclosure, all other embodiments obtained by those of ordinary skill in the art without creative efforts shall fall within the protection scope of this disclosure.

FIG. 1 is a schematic flowchart of an activation indication method according to some embodiments of this disclosure. The activation indication method shown in some embodiments may be applicable to a base station, and the base station includes but is not limited to a 4G base station, a 5G base station, and a 6G base station. The base station may communicate with a terminal serving as a user equipment, and the terminal includes but is not limited to an electronic device such as a mobile phone, a tablet computer, a wearable device, a sensor, and an Internet of Things (IoT) device. In some embodiments, the terminal may be a terminal to which the activation determination method described in any following embodiment is applicable.

In the CA/DC scenario, the power consumption of the terminal and the network is a problem due to the simultaneous maintenance of radio links for multiple carriers. In the CA/DC scenario, the primary cell is generally used for providing coverage, and the secondary cell is used for providing capacity. When parameters such as the data rate of the terminal change dynamically, the network capacity may be changed by activating/deactivating the secondary cell(s), thereby adjusting the power consumption of the terminal and the network.

Sometimes, the terminal is indicated to activate/deactivate the SCell through high-level signaling, for example, a medium access control layer control element (MAC CE). Since the high-level signaling is above the physical layer, many processing procedures are required. Accordingly, the time delay for indicating the terminal is relatively large, which is not conducive to the efficient utilization of radio resources and the energy saving of the terminal.

As shown in FIG. 1, the activation indication method may include the following steps.

In step S101, downlink control information (DCI) is sent to the terminal, where the DCI is used for indicating the terminal to activate and/or deactivate the secondary cell (SCell).

In some embodiments of this disclosure, different from other implementations, the terminal can be indicated to activate the SCell through DCI, the terminal can also be indicated to deactivate the SCell through DCI, and the indicated SCell can be determined by the base station or by the terminal.

Since DCI is generally located in the physical downlink control channel (PDCCH), it belongs to physical-layer information. The process of sending the physical-layer information by the base station is simpler than that of sending high-level signaling (e.g., MAC CE) by the base station, so the terminal can be quickly indicated, thereby reducing the time delay of indicating the terminal to activate and/or deactivate the SCell, so that the terminal can activate and/or deactivate the indicated SCell as soon as possible according to the DCI, which is beneficial to the efficient utilization of radio resources and the energy saving of the terminal.

In some embodiments of this disclosure, the terminal may be indicated to activate and/or deactivate the SCell through DCI. However, for a DCI in some other implentations, its format and indicated information have been determined. In order to functionally distinguish from the existing DCI(s), following embodiments are provided for exemplary description.

Optionally, a format of the DCI used for indicating the terminal to activate and/or deactivate the SCell is different from the format of the DCI used for indicating other information.

In some embodiments, the DCI used for indicating the terminal to activate and/or deactivate the SCell may be generated by adding a new field to an existing DCI format. For example, the new field is added in DCI format 1_0, DCI format 1_1, and DCI format 2_0. Alternatively, a separate DCI in a format different from the DCI in the other implementations is used for indicating the terminal to activate and/or deactivate the SCell.

Optionally, a radio network temporary identifier (RNTI) corresponding to the DCI used for indicating the terminal to activate and/or deactivate the SCell (the DCI may be specially used for indicating the terminal to activate and/or deactivate the SCell) is different from an RNTI corresponding to a DCI used for indicating other information.

In some embodiments, for the DCI used for indicating the terminal to activate and/or deactivate the SCell, the RNTI corresponding to the DCI may be configured to be different from the RNTI corresponding to DCI used for indicating other information.

The RNTI may be used by the terminal to derive the DCI from the PDCCH. For example, the RNTI (e.g., RNTI1) configured for the terminal corresponding to the DCI indicating the terminal to activate and/or deactivate the SCell is different from the RNTI (e.g., RNTI2, RNTI3, RNTI4, etc.) configured for the terminal corresponding to the DCI indicating other information. Accordingly, the DCI derived based on RNTI1 by the terminal from the PDCCH may be used for activating and/or deactivating the SCell.

Optionally, the DCI includes at least a first field and a second field, where the first field is used for indicating the terminal to activate and/or deactivate an SCell, and the second field is used for indicating other information.

In some embodiments, the DCI in the other implementations may be reused. However, the meanings of fields in the DCI of the other implementations have been determined. According to this disclosure, a field (e.g., called the first field) may be added in the DCI for indicating the terminal to activate and/or deactivate the SCell. Accordingly, an original field (e.g., the second field) in the DCI may continue to be used for indicating other information, so that it does not affect the original function of the DCI while being reused.

In some embodiments, the first field may include a first target field in the following embodiments, or may include a second target field in the following embodiments. For example, the first field is the first target field, or the first field is the second target field.

FIG. 2 is a schematic flowchart of another activation indication method according to some embodiments of this disclosure. As shown in FIG. 2, the method further includes following steps.

In step S201, grouping information is obtained by grouping SCells available to the terminal.

In step S202, the grouping information is sent to the terminal.

In some embodiments, since the number of SCells available to the terminal may be large, but the bits in the DCI are limited, it may be difficult to indicate each SCell separately. Accordingly, the SCells available to the terminal may be grouped in this disclosure, so that the SCell group as grouped can be indicated. Moreover, the grouping information obtained by the grouping may also be sent to the terminal, so that the terminal can determine the specific indication situation of the DCI based on the grouping information.

In some embodiments, the number of SCells available to the terminal may be determined first, and the SCells available to the terminal are grouped only when the number of SCells available to the terminal is greater than a preset number. When the number of SCells available to the terminal is less than the preset number, it may not be necessary to group the SCells available to the terminal.

Optionally, the grouping information includes at least one of the following:

SCells in each SCell group, and the number of groups for grouping the SCells.

It should be noted that the grouping information is not limited to the above information. For example, it may also include the number of SCells in each SCell group, the correspondence between respective SCell groups and bits in the DCI, and the like.

Optionally, the DCI includes a first target field, the number of bits of the first target field is equal to the number of groups, and the first target field is used for indicating to activate an SCell in a first target group obtained by grouping the SCells and/or deactivate an SCell in a second target group obtained by grouping the SCells.

In some embodiments, the DCI may include the first target field, where the first target field may include all fields of the DCI, or a part of the fields in the DCI, and the number of bits of the first target field is equal to the number of groups. Accordingly, the first target field may be used for indicating to activate the SCell in the first target group obtained by grouping the SCells, or the first target field may be used for indicating to deactivate the SCell in the second target group obtained by grouping the SCells. In some embodiments, the first target group may include one SCell group or multiple SCell groups (e.g., it may include all SCell groups as grouped, or part of the SCell groups), and the second target group may include one SCell group or multiple SCell groups (e.g., it may include all SCell groups as grouped, or part of the SCell groups).

For example, there are 31 SCells available to the terminal, and the sequence numbers thereof are 0 to 30. The SCells are grouped to obtain 4 SCell groups. The first SCell group includes 8 SCells, which are SCell0 to SCell7, the second SCell group includes 8 SCells, which are SCell8 to SCell15, the third SCell group includes 8 SCells, which are SCell16 to SCell23, and the fourth SCell group includes 7 SCells, which are SCell24 to SCell30.

The first target field in the DCI includes 4 bits, for example, the first bit is associated with the first SCell group, the second bit is associated with the second SCell group, the third bit is associated with the third SCell group, and the fourth bit is associated with the fourth SCell group. The bit 0 indicates deactivation, and the bit 1 indicates activation.

For example, when the first target field in the DCI is 0101, the DCI may indicate the terminal to deactivate the SCells in the first SCell group and the third SCell group, and activate the SCells in the second SCell group and the fourth SCell group. For example, when the first target field in the DCI is 1111, the DCI may indicate the terminal to activate the SCells in the four SCell groups.

If each SCell is indicated by one bit, 31 bits are required. However, in the forgoing embodiments, the 4-bit field can be used for indicating the terminal to activate and/or deactivate 31 SCells, thereby effectively reducing the number of bits occupied by the DCI, which are conducive to saving communication resources.

Optionally, the DCI includes a second target field, the number of bits of the second target field is 1, and the number of groups for grouping SCells is 2.

The second target field is used for indicating to activate an SCell in a first SCell group, and deactivate an SCell in a second SCell group.

Alternatively, the second target field is used for indicating to deactivate an SCell in the first SCell group, and activate an SCell in the second SCell group.

In some embodiments, the DCI may include the second target field, where the second target field may include all the fields of the DCI, or may include a part of the fields in the DCI. The number of bits of the second target field is 1, and the number of groups for grouping the SCells is 2. Agreement may be pre-established between the base station and the terminal in that, for the SCells divided into two groups, the two SCell groups may include two following cases. In the first case, the SCells in the first SCell group are to be activated, and the SCells in the second SCell group are to be deactivated. In the other case, the SCells in the first SCell group are to be deactivated, and the SCells in the second SCell group are to be activated. Then these two cases can be indicated by one bit.

For example, there are 31 SCells available to the terminal, and the sequence numbers thereof are 0 to 30. The SCells are grouped to obtain 2 SCell groups. The first SCell group includes 16 SCells, which are SCell0 to SCell15. The second SCell group includes 15 SCells, which are SCell16 to SCell130.

For example, when the second target field in the DCI is 1, the DCI may indicate the terminal to activate 16 SCells in the first SCell group and deactivate 15 SCells in the second SCell group. For another example, when the second target field in the DCI is 0, the DCI may indicate the terminal to deactivate 16 SCells in the first SCell group and activate 15 SCells in the second SCell group.

If each SCell is indicated by one bit, 31 bits are required. However, in the forgoing embodiments, the terminal can be indicated to activate and/or deactivate 31 SCells through a 1-bit field, thereby effectively reducing the number of bits occupied by the DCI, which are conducive to saving communication resources.

FIG. 3 is a schematic flowchart of an activation determination method according to some embodiments of this disclosure. The activation determination method shown in some embodiments may be applicable to terminals, and the terminals include but are not limited to electronic devices such as mobile phones, tablet computers, wearable devices, sensors, and IoT devices. The terminal may, serving as a user equipment, communicate with a base station, and the base station includes but is not limited to a 4G base station, a 5G base station, and a 6G base station. In some embodiments, the base station may be a base station to which the activation indication method described in any of the foregoing embodiments is applicable.

As shown in FIG. 3, the activation determination method may include the following steps.

In step S301, DCI sent by the base station is received.

In step S302, an SCell is activated and/or deactivated according to the DCI.

Since DCI is generally located in the PDCCH, it belongs to physical-layer information. The process of sending the physical-layer information by the base station is simpler than that of sending high-level signaling (e.g., MAC CE) by the base station, so the terminal can be quickly indicated, thereby reducing the time delay of indicating the terminal to activate and/or deactivate the SCell, so that the terminal can activate and/or deactivate the indicated SCell as soon as possible according to the DCI, which is beneficial to the efficient utilization of radio resources and the energy saving of the terminal.

FIG. 4 is a schematic flowchart of another activation determination method according to some embodiments of this disclosure. As shown in FIG. 4, the method further includes a following step.

In step S401, according to a format of the DCI, it is determined that the DCI is used for indicating the terminal to activate and/or deactivate the SCell.

In some embodiments, the DCI used for indicating the terminal to activate and/or deactivate the SCell may be generated by adding a new field to an existing DCI format. For example, the new field is added in DCI format 1_0, DCI format 1_1, and DCI format 2_0. Alternatively, a separate DCI in a format different from the DCI in other implementations is used for indicating the terminal to activate and/or deactivate the SCell.

Accordingly, the terminal can determine that the DCI is used for indicating the terminal to activate and/or deactivate the SCell according to the format of the DCI. For example, the terminal determines that the DCI, which is in a format different from DCI format 1_0, DCI format 1_1, and DCI format 2_0 as described above, is used for indicating the terminal to activate and/or deactivate the SCell.

FIG. 5 is a schematic flowchart of yet another activation determination method according to some embodiments of this disclosure. As shown in FIG. 5, the method further includes a following step.

In step S501, according to an RNTI corresponding to the DCI (the DCI may be specially used for indicating the terminal to activate and/or deactivate the SCell), it is determined that the DCI is used for indicating the terminal to activate and/or deactivate SCell.

In some embodiments, for the DCI used for indicating the terminal to activate and/or deactivate the SCell, the RNTI corresponding to the DCI may be configured to be different from the RNTI corresponding to DCI used for indicating other information.

The RNTI may be used by the terminal to derive the DCI from the PDCCH. For example, the RNTI (e.g., RNTI1) configured for the terminal corresponding to the DCI indicating the terminal to activate and/or deactivate the SCell is different from the RNTI (e.g., RNTI2, RNTI3, RNTI4, etc.) configured for the terminal corresponding to the DCI indicating other information. Accordingly, the DCI derived based on RNTI1 by the terminal from the PDCCH may be used for activating and/or deactivating the SCell.

FIG. 6 is a schematic flowchart of yet another activation determination method according to some embodiments of this disclosure. As shown in FIG. 6, the activation and/or deactivation of the SCell according to the DCI includes a following step.

In step S601, in response to sending a hybrid automatic repeat request-acknowledgement (HARQ-ACK) corresponding to the DCI to the base station, the SCell is activated and/or deactivated according to the DCI.

In some embodiments, without multiplexing the DCI in other implementations, the terminal can send the HARQ-ACK corresponding to the DCI to the base station after determining that the DCI is correctly received. In this way, the terminal can determine that the content indicated in the DCI has been successfully obtained and, thus, can perform activation and/or deactivation of the SCell according to the DCI.

It should be noted that, before determining that the content indicated in the DCI has been successfully acquired, the terminal still uses the activated and inactivated states of the SCells in the case of not receiving the DCI.

FIG. 7 is a schematic flowchart of yet another activation determination method according to some embodiments of this disclosure. As shown in FIG. 7, the activation and/or deactivation of the SCell according to the DCI include following steps.

In step S701, a first field is determined in the DCI, where the first field is used for indicating the terminal to activate and/or deactivate the SCell, and the DCI further includes a second field used for indicating other information.

In step S702, the SCell is activated and/or deactivated according to the first field.

In some embodiments, a DCI in other implementations may be multiplexed. Although fields in the DCI in other implementations have definite meanings, a field, such as the first field, may be added to the DCI according to this disclosure, so as to indicate the terminal to activate and/or deactivate the SCell. Then the original fields in the DCI, such as the second field, may continue to be used for indicating other information.

The terminal can activate and/or deactivate the SCell according to the first field, and can still determine, based on the second field, other information indicated by the second field, so that the DCI can be multiplexed without affecting the original function of the DCI.

In some embodiments, the first field may include the first target field in some following embodiments, or may include the second target field in some following embodiments. For example, the first field is the first target field, or the first field is the second target field.

FIG. 8 is a schematic flowchart of yet another activation determination method according to some embodiments of this disclosure. As shown in FIG. 8, the activation and/or deactivation of the SCell according to the DCI includes a following step.

In step S801, in response to sending of a physical uplink shared channel (PUSCH) scheduled by the DCI or in response to sending of an HARQ-ACK corresponding to a physical downlink shared channel (PDSCH) scheduled by the DCI, the activation and/or deactivation of the SCell is performed according to the DCI.

In some embodiments, in the case of multiplexing the DCI in other implementations, the terminal may operate based on the channel scheduled by the DCI.

For example, the DCI is used for scheduling the PUSCH. When the PUSCH scheduled by the DCI is sent, it can be determined that the content indicated in the DCI has been successfully obtained, and then the SCell can be activated and/or deactivated according to the DCI.

For another example, the DCI is used for scheduling the PDSCH. When the PDSCH scheduled by DCI is correctly received, the HAQR-ACK corresponding to the PDSCH may be sent to the base station. Accordingly, when the HAQR-ACK corresponding to the PDSCH is sent, it can be determined that the content indicated in the DCI has been successfully obtained. Then, the SCell can be activated and/or deactivated according to the DCI.

It should be noted that, before it is determined that the content indicated in the DCI has been successfully obtained, the terminal may still use the activated and inactivated states of the SCells in the case of not receiving the DCI.

FIG. 9 is a schematic flowchart of yet another activation determination method according to some embodiments of this disclosure. As shown in FIG. 9, the method further includes a following step.

In step S901, grouping information sent by the base station and obtained by grouping the SCells available to the terminal is received.

Optionally, the grouping information includes at least one of the following:

SCells in each SCell group, and the number of groups for grouping the SCells.

FIG. 10 is a schematic flowchart of yet another activation determination method according to some embodiments of this disclosure. As shown in FIG. 10, the DCI includes a first target field, the number of bits of the first target field is equal to the number of groups, and the activation and/or deactivation of the SCell according to the DCI includes following steps.

In step S1001, grouping information sent by the base station and obtained by grouping the SCells available to the terminal is received. In step S1002, according to the grouping information and the first target field, a first target group obtained by grouping the SCells and an SCell in the first target group are activated, and/or a second target group obtained by grouping the SCells and an SCell in the second target group are deactivated.

In some embodiments, the DCI may include the first target field, where the first target field may include all fields of the DCI, or a part of the fields in the DCI, and the number of bits of the first target field is equal to the number of groups. Accordingly, the first target field may be used for indicating to activate the SCell in the first target group obtained by grouping the SCells, or the first target field may be used for indicating to deactivate the SCell in the second target group obtained by grouping the SCells. In some embodiments, the first target group may include one SCell group or multiple SCell groups (e.g., it may include all SCell groups as grouped, or part of the SCell groups), and the second target group may include one SCell group or multiple SCell groups (e.g., it may include all SCell groups as grouped, or part of the SCell groups).

For example, there are 31 SCells available to the terminal, and the sequence numbers thereof are 0 to 30. The SCells are grouped to obtain 4 SCell groups. The first SCell group includes 8 SCells, which are SCell0 to SCell7, the second SCell group includes 8 SCells, which are SCell8 to SCell15, the third SCell group includes 8 SCells, which are SCell16 to SCell23, and the fourth SCell group includes 7 SCells, which are SCell24 to SCell30.

The first target field in the DCI includes 4 bits, for example, the first bit is associated with the first SCell group, the second bit is associated with the second SCell group, the third bit is associated with the third SCell group, and the fourth bit is associated with the fourth SCell group. The bit 0 indicates deactivation, and the bit 1 indicates activation.

For example, when the first target field in the DCI is 0101, the DCI may indicate the terminal to deactivate the SCells in the first SCell group and the third SCell group, and activate the SCells in the second SCell group and the fourth SCell group. For example, when the first target field in the DCI is 1111, the DCI may indicate the terminal to activate the SCells in the four SCell groups.

If each SCell is indicated by one bit, 31 bits are required. However, in the forgoing embodiments, the 4-bit field can be used for indicating the terminal to activate and/or deactivate 31 SCells, thereby effectively reducing the number of bits occupied by the DCI, which are conducive to saving communication resources.

Optionally, the DCI includes a second target field, the number of bits of the second target field is 1, and the number of groups for grouping SCells is 2. The activation and/or deactivation of the SCell according to the DCI may include following steps.

Activation of an SCell in a first SCell group and deactivation of an SCell in a second SCell group are performed according to the second target field.

Alternatively, deactivation of an SCell in the first SCell group and activation of an SCell in the second SCell group are performed according to the second target field.

In some embodiments, the DCI may include the second target field, where the second target field may include all the fields of the DCI, or may include a part of the fields in the DCI. The number of bits of the second target field is 1, and the number of groups for grouping the SCells is 2. Agreement may be pre-established between the base station and the terminal in that, for the SCells divided into two groups, the two SCell groups may include two following cases. In the first case, the SCells in the first SCell group are to be activated, and the SCells in the second SCell group are to be deactivated. In the other case, the SCells in the first SCell group are to be deactivated, and the SCells in the second SCell group are to be activated. Then these two cases can be indicated by one bit.

For example, there are 31 SCells available to the terminal, and the sequence numbers thereof are 0 to 30. The SCells are grouped to obtain 2 SCell groups. The first SCell group includes 16 SCells, which are SCell10 to SCell15. The second SCell group includes 15 SCells, which are SCell16 to SCell130.

For example, when the second target field in the DCI is 1, the DCI may indicate the terminal to activate 16 SCells in the first SCell group and deactivate 15 SCells in the second SCell group. For another example, when the second target field in the DCI is 0, the DCI may indicate the terminal to deactivate 16 SCells in the first SCell group and activate 15 SCells in the second SCell group.

If each SCell is indicated by one bit, 31 bits are required. However, in the forgoing embodiments, the terminal can be indicated to activate and/or deactivate 31 SCells through a 1-bit field, thereby effectively reducing the number of bits occupied by the DCI, which are conducive to saving communication resources.

Corresponding to the foregoing embodiments of the activation indication method and the activation determination method, this disclosure also provides embodiments of an activation indication apparatus and an activation determination apparatus.

FIG. 11 is a block diagram of an activation indication apparatus according to some embodiments of this disclosure. The activation indication apparatus shown in some embodiments may be applicable to a base station, and the base station includes but is not limited to a 4G base station, a 5G base station, and a 6G base station. The base station may communicate with a terminal serving as a user equipment, and the terminal includes but is not limited to electronic devices such as mobile phones, tablet computers, wearable devices, sensors, and IoT devices. In some embodiments, the terminal may be a terminal to which the activation determination apparatus described in any following embodiment is applicable.

As shown in FIG. 11, the activation indication apparatus may include:

a first sending module 1101, configured to send DCI to a terminal, where the DCI is used for indicating the terminal to activate and/or deactivate an SCell.

Optionally, a format of the DCI used for indicating the terminal to activate and/or deactivate the SCell is different from a format of a DCI used for indicating other information.

Optionally, an RNTI corresponding to the DCI used for indicating the terminal to activate and/or deactivate the SCell is different from an RNTI corresponding to a DCI used for indicating other information.

Optionally, the DCI includes at least a first field and a second field, where the first field is used for indicating the terminal to activate and/or deactivate the SCell, and the second field is used for indicating other information.

FIG. 12 is a block diagram of another activation indication apparatus according to some embodiments of this disclosure. As shown in FIG. 12, the device further includes:

a grouping module 1201, configured to obtain grouping information by grouping SCells available to the terminal; and a second sending module 1202, configured to send the grouping information to the terminal.

Optionally, the grouping information includes at least one of the following:

SCells in each SCell group, and the number of groups for grouping the SCells.

Optionally, the DCI includes a first target field, a number of bits of the first target field is equal to the number of groups, and the first target field is used for indicating to activate an SCell in a first target group obtained by grouping the SCells and/or deactivate an SCell in a second target group obtained by grouping the SCells.

Optionally, the DCI includes a second target field, the number of bits of the second target field is 1, and the number of groups for SCell grouping is 2.

The second target field is used for indicating to activate an SCell in a first SCell group, and deactivate an SCell in a second SCell group.

Alternatively, the second target field is used for indicating to deactivate an SCell in the first SCell group, and activate an SCell in the second SCell group.

Figure 13:
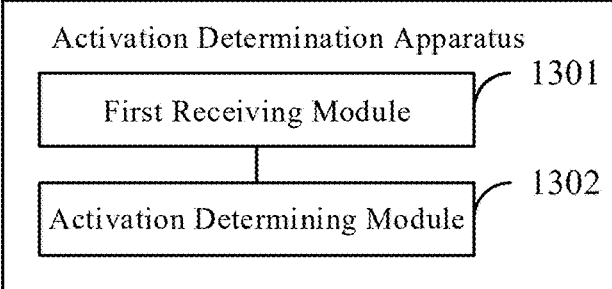
FIG. 13 is a block diagram of an activation determination apparatus according to some embodiments of this disclosure.

FIG. 13 is a block diagram of an activation determination apparatus according to some embodiments of this disclosure. The activation determination apparatus shown in some embodiments may be applicable to terminals, and the terminals include but are not limited to electronic devices such as mobile phones, tablet computers, wearable devices, sensors, and IoT devices. The terminal may, serving as a user equipment, communicate with a base station, and the base station includes but is not limited to a 4G base station, a 5G base station, and a 6G base station. In some embodiments, the base station may be a base station to which the activation indication apparatus described in any of the foregoing embodiments is applicable.

As shown in FIG. 13, the activation determination apparatus may include:

a first receiving module 1301, configured to receive DCI sent by the base station; and an activation determining module 1302, configured to perform activation and/or deactivation of an SCell according to the DCI.

Figure 14:
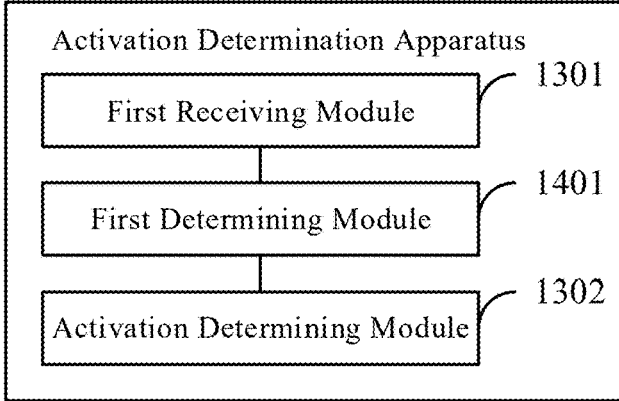
FIG. 14 is a block diagram of another activation determination apparatus according to some embodiments of this disclosure.

FIG. 14 is a block diagram of another activation determination apparatus according to some embodiments of this disclosure. As shown in FIG. 14, the device further includes:

a first determining module 1401, configured to determine, according to a format of the DCI, that the DCI is used for indicating the terminal to activate and/or deactivate the SCell.

Figure 15:
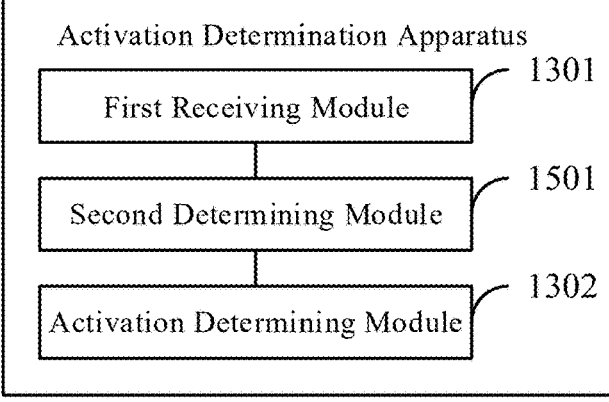
FIG. 15 is a block diagram of yet another activation determination apparatus according to some embodiments of this disclosure.

FIG. 15 is a block diagram of yet another activation determination apparatus according to some embodiments of this disclosure. As shown in FIG. 15, the device further includes:

a second determining module 1501, configured to determine, according to an RNTI corresponding to the DCI, that the DCI is used for indicating the terminal to activate and/or deactivate the SCell.

Optionally, the activation determining module is configured to perform, in response to sending an HARQ-ACK corresponding to the DCI to the base station, activation and/or deactivation of the SCell according to the DCI.

Optionally, the activation determining module is configured to determine a first field in the DCI, where the first field is used for indicating the terminal to activate and/or deactivate the SCell, and the DCI further includes a second field used for indicating other information; and perform activation and/or deactivation of the SCell according to the first field.

Optionally, the activation determining module is configured to perform, in response to sending of a PUSCH scheduled by the DCI or in response to sending of an HARQ-ACK corresponding to a PDSCH scheduled by the DCI, activation and/or deactivation of the SCell according to the DCI.

Figure 16:
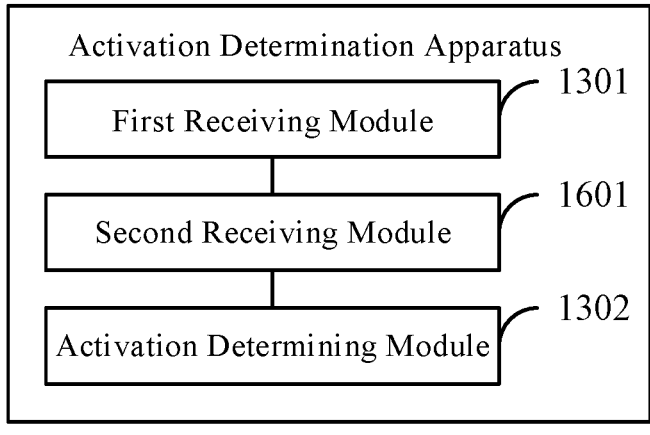
FIG. 16 is a block diagram of yet another activation determination apparatus according to some embodiments of this disclosure.

FIG. 16 is a block diagram of yet another activation determination apparatus according to some embodiments of this disclosure. As shown in FIG. 16, the device further includes:

a second receiving module 1601, configured to receive grouping information sent by the base station and obtained by grouping the SCells available to the terminal.

Optionally, the grouping information includes at least one of the following:

SCells in each SCell group, and the number of groups for grouping SCells.

Optionally, the DCI includes a first target field, the number of bits of the first target field is equal to the number of groups, and the activation determining module is configured to perform, according to the grouping information and the first target field, activation of a first target group obtained by grouping the SCells and an SCell in the first target group, and/or deactivation of a second target group obtained by grouping the SCells and an SCell in the second target group.

The DCI includes a second target field, the number of bits of the second target field is 1, the number of groups for SCell grouping is 2, and the activation determining module is configured to:

activate an SCell in a first SCell group and deactivate an SCell in a second SCell group according to the second target field, or deactivate an SCell in the first SCell group and activate an SCell in the second SCell group according to the second target field.

Regarding the apparatuses in the foregoing embodiments, the specific manners in which each module performs operations have been described in detail in some embodiments of the related methods, and will not be described in detail here.

For the apparatus embodiments, since they basically correspond to the method embodiments, reference may be made to the partial descriptions of the method embodiments for relevant parts. The apparatus embodiments described above are only illustrative, where the modules described as separate components may be or may not be physically separated, and the components displayed as modules may be or may not be physical modules. In other words, they may be located in the same place, or may be distributed over multiple network modules. Some or all of the modules may be selected according to actual needs to achieve the purpose of the solution in some embodiments, which can be understood and implemented by those of ordinary skill in the art without creative effort.

Embodiments of this disclosure also provide an electronic device, including:

a processor; and a memory for storing instructions executable by the processor;

where the processor is configured to implement the activation indication method according to any one of the foregoing embodiments.

Embodiments of this disclosure also provide an electronic device, including:

a processor; and a memory for storing instructions executable by the processor;

where the processor is configured to implement the activation determination method according to any one of the above embodiments.

Embodiments of this disclosure also provide a computer-readable storage medium, on which a computer program is stored, and the program is used for, when being executed by a processor, implementing steps in the activation indication method according to any of the foregoing embodiments.

Embodiments of this disclosure also provide a computer-readable storage medium, on which a computer program is stored, and the program is used for, when being executed by a processor, implementing steps in the activation determination method according to any of the foregoing embodiments.

Figure 17:
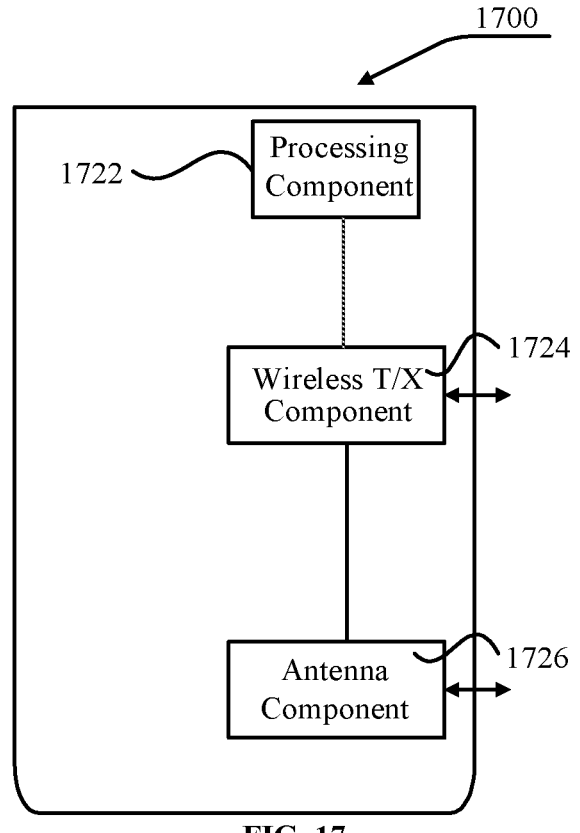
FIG. 17 is a block diagram of a device for activation indication according to some embodiments of this disclosure.

As shown in FIG. 17, FIG. 17 is a block diagram of a device 1700 for activation indication according to some embodiments of this disclosure. The device 1700 may be provided as a base station. Referring to FIG. 17, the device 1700 includes a processing component 1722, a wireless transmit/receive (T/X) component 1724, an antenna component 1726, and a signal processing portion specific to a wireless interface. The processing component 1722 may further include one or more processors. One of the processors in the processing component 1722 may be configured to implement the activation indication method according to any of the foregoing embodiments.

Figure 18:
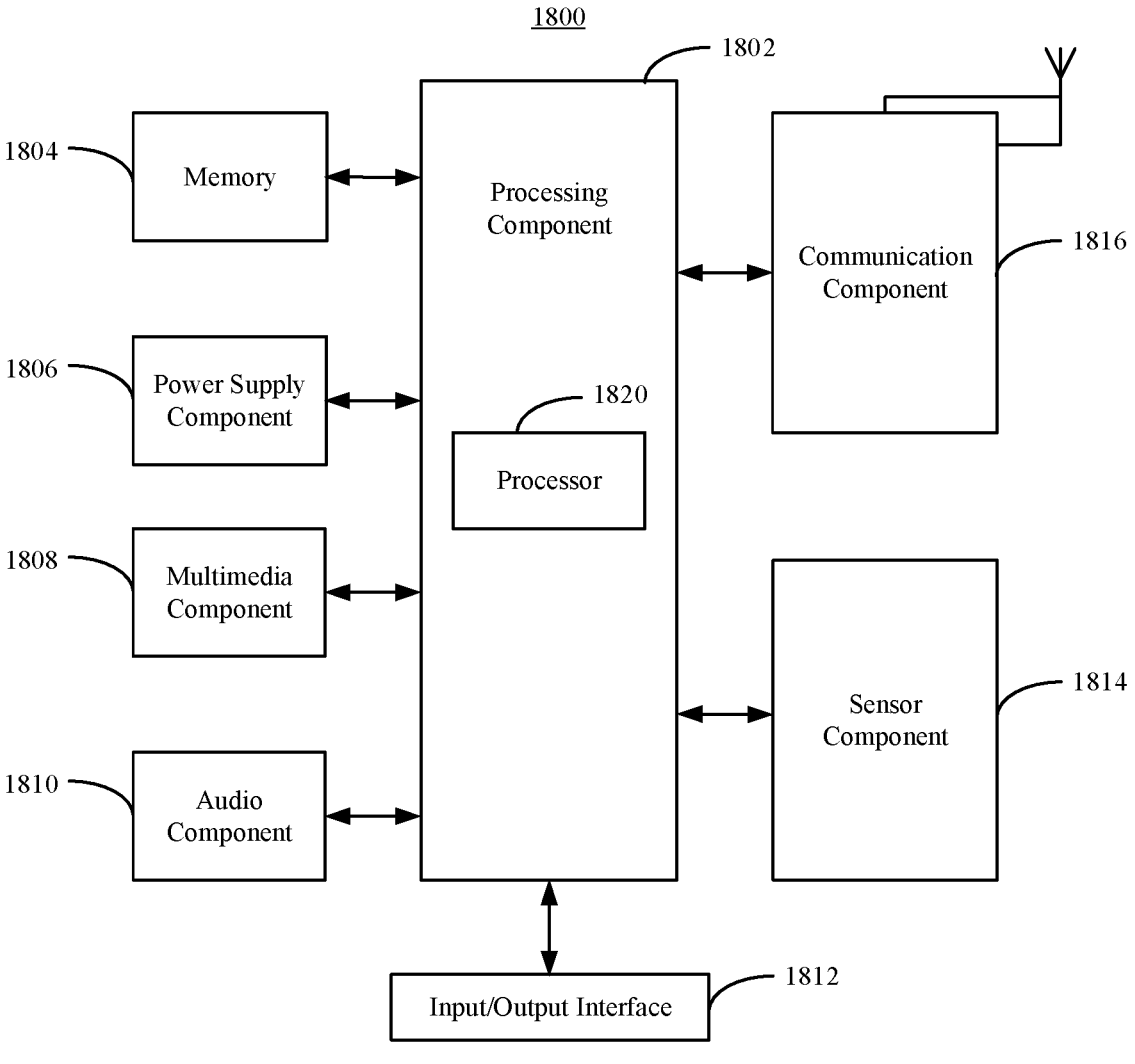
FIG. 18 is a block diagram of a device for activation determination according to some embodiments of this disclosure.

FIG. 18 is a block diagram of a device 1800 for activation determination according to some embodiments of this disclosure. For example, device 1800 may be a mobile phone, computer, digital broadcast terminal, messaging device, game console, tablet device, medical device, fitness device, personal digital assistant, and the like.

Referring to FIG. 18, the device 1800 may include one or more of the following components: a processing component 1802, a memory 1804, a power supply component 1806, a multimedia component 1808, an audio component 1810, an input/output (I/O) interface 1812, a sensor component 1814, and a communication component 1816.

The processing component 1802 generally controls the overall operation of the device 1800, such as operations associated with display, phone calls, data communications, camera operations, and recording operations. The processing component 1802 may include one or more processors 1820 to execute instructions to perform all or part of the steps of the activation determination method described above. Additionally, the processing component 1802 may include one or more modules that facilitate interaction between processing component 1802 and other components. For example, processing component 1802 may include a multimedia module to facilitate interaction between the multimedia component 1808 and the processing component 1802.

The memory 1804 is configured to store various types of data to support operations at the device 1800. Examples of such data include instructions for any application or method operating on the device 1800, contact data, phonebook data, messages, pictures, videos, and the like. The memory 1804 may be implemented by any type of volatile or non-volatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 1806 provides power to various components of device 1800. The power supply component 1806 may include a power management system, one or more power supplies, and other components associated with generating, managing, and distributing power for the device 1800.

The multimedia component 1808 includes a screen that provides an output interface between the device 1800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The touch sensor can sense not only the boundaries of a touch or swipe action, but also the duration and pressure associated with the touch or swipe action. In some embodiments, the multimedia component 1808 includes a front camera and/or a rear camera. When the apparatus 1800 is in an operation mode, such as a shooting mode or a video mode, the front camera and/or the rear camera may receive external multimedia data. Each of the front and rear cameras may be a fixed optical lens system, or may have focal length and optical zoom capability.

The audio component 1810 is configured to output and/or input audio signals. For example, the audio component 1810 includes a microphone (MIC) that is configured to receive external audio signals when the device 1800 is in an operating mode, such as call mode, recording mode, and voice recognition mode. The received audio signal may be further stored in the memory 1804 or transmitted via the communication component 1816. In some embodiments, the audio component 1810 also includes a speaker for outputting audio signals.

The I/O interface 1812 provides an interface between the processing component 1802 and a peripheral interface module, which may be a keyboard, a click wheel, a button, or the like. These buttons may include, but are not limited to: home button, volume buttons, start button, and lock button.

The sensor component 1814 includes one or more sensors for providing status assessment of various aspects of the device 1800. For example, the sensor assembly 1814 may detect the turn-on/turn-off state of the device 1800, the relative positioning of components such as the display and keypad of the device 1800. The sensor component 1814 may also detect a change in the position of the device 1800 or a component of the device 1800, the presence or absence of user contact with the device 1800, the orientation or acceleration/deceleration of the device 1800, and the temperature change of the device 1800. The sensor component 1814 may include a proximity sensor configured to detect the presence of nearby objects in the absence of any physical contact. The sensor component 1814 may also include a light sensor, such as a CMOS or CCD image sensor, for use in imaging applications. In some embodiments, the sensor component 1814 may also include an acceleration sensor, a gyroscope sensor, a magnetic sensor, a pressure sensor, or a temperature sensor.

The communication component 1816 is configured to facilitate wired or wireless communication between the device 1800 and other devices. The device 1800 may access wireless networks based on communication standards, such as WiFi, 2G or 3G, 4G LTE, 5G NR, or a combination thereof. In some exemplary embodiments, the communication component 1816 receives broadcast signals from an external broadcast management system or broadcast related information via a broadcast channel. In some exemplary embodiments, the communication component 1816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In some exemplary embodiments, the device 1800 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, so as to perform the activation determination method described above.

In some exemplary embodiments, there is also provided a non-transitory computer-readable storage medium including instructions, such as memory 1804 including instructions executable by the processor 1820 of the device 1800, so as to implement the activation determination method described above. For example, the non-transitory computer-readable storage medium may include ROM, random access memory (RAM), CD-ROM, magnetic tape, floppy disk, optical data storage device, and the like.

Embodiments of this disclosure further provide an activation indication apparatus, an activation determination apparatus and a computer-readable storage medium.

According to a first aspect of the embodiments of this disclosure, an activation indication apparatus is provided, which is applicable to a base station and includes:

a first sending module, configured to send DCI to a terminal, where the DCI is used for indicating the terminal to activate and/or deactivate an SCell.

According to a second aspect of the embodiments of this disclosure, an activation determination apparatus is provided, which is applicable to a terminal and includes:

a first receiving module, configured to receive DCI sent by a base station; and an activation determining module, configured to perform activation and/or deactivation of an SCell according to the DCI.

According to a third aspect of the embodiments of this disclosure, a computer-readable storage medium is provided, on which a computer program is stored, where the program is used for, when being executed by a processor, implementing steps in the activation indication method as described above.

According to a fourth aspect of the embodiments of this disclosure, a computer-readable storage medium is provided, on which a computer program is stored, where the program is used for, when being executed by a processor, implementing steps in the activation determination method as described above.

According to some embodiments of this disclosure, since DCI is generally located in the physical downlink control channel (PDCCH), it belongs to physical-layer information. The process of sending physical-layer information by the base station is simpler than that of sending high-level signaling (e.g., MAC CE) by the base station, so the terminal can be quickly indicated, thereby reducing the time delay of indicating the terminal to activate and/or deactivate the SCell, so that the terminal can activate and/or deactivate the indicated SCell as soon as possible according to the DCI, which is beneficial to the efficient utilization of radio resources and the energy saving of the terminal.

Other embodiments of this disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only.

It is to be understood that this disclosure is not limited to the precise structures described above and illustrated in the accompanying drawings, and that various modifications and changes may be made without departing from the scope thereof.

It should be noted that, in this document, relational terms such as first and second are only used to distinguish one entity or operation from another entity or operation, and do not necessarily require or imply the presence of any such actual relationship or sequence between these entities or operations. The terms "comprise/comprising", "include/including" or any other variation thereof are intended to encompass non-exclusive inclusion such that a process, method, article or device/apparatus comprising/including a list of elements includes not only those elements, but also other elements not expressly listed, or also include other elements inherent to such process, method, article or device/apparatus. Without further limitation, an element limited by the phrase "comprising/including a . . . " does not preclude the presence of additional equivalent elements in the process, method, article or device/apparatus that includes the element.

The methods and devices/apparatuses provided by some embodiments of this disclosure have been described in detail above, and specific examples are used to illustrate the principles and implementations of this disclosure. At the same time, for those of ordinary skill in the art, according to the idea of this disclosure, there will be changes in the specific implementation and application scope. In summary, the content of this specification should not be construed as a limitation to this disclosure.

What is claimed is:

1. An activation indication method, comprising:

sending, by a base station, downlink control information (DCI) to a terminal, wherein the DCI is used for indicating the terminal to perform at least one of activation and deactivation of a secondary cell (SCell);

a format of the DCI used for indicating the terminal to perform at least one of activation and deactivation of the SCell is different from a format of another DCI used for indicating other information, and the DCI comprises a first field used for indicating the terminal to perform at least one of activation and deactivation of the SCell;

obtaining SCell grouping information by grouping SCells available to the terminal; and sending the SCell grouping information, available to the terminal, to the terminal, wherein the SCell grouping information comprises SCells in each SCell group;

wherein the first field comprises a first target field, a number of bits of the first target field is equal to a number of available SCell groups, the available SCell groups comprise a first target group and a second target group, and the first target field is used for indicating the terminal to perform at least one of: activating an SCell in the first target group, or deactivating an SCell in the second target group;

wherein the first field comprises a second target field, a number of bits of the second target field is 1, and a number of groups for grouping the SCells is 2, and the second target field is used for indicating the terminal to activate an SCell in a first SCell group and deactivate an SCell in a second SCell group, or the second target field is used for indicating the terminal to deactivate an SCell in the first SCell group and activate an SCell in the second SCell group.

2. The method according to claim 1, wherein a radio network temporary identifier (RNTI) corresponding to the DCI used for indicating the terminal to perform at least one of activation and deactivation of the SCell is different from an RNTI corresponding to the another DCI used for indicating other information.

3. The method according to claim 1, wherein the DCI comprises a second field, wherein the second field is used for indicating the other information.

4. The method according to claim 1, wherein the SCell grouping information comprises: a number of groups for grouping the SCells.

5. The method according to claim 1, wherein obtaining the SCell grouping information by grouping SCells available to the terminal comprises:

determining a number of SCells available to the terminal, and grouping SCells available to the terminal when the number of SCells available to the terminal is greater than a preset number.

6. The method according to claim 1, wherein the DCI used for indicating the terminal to perform at least one of activation and deactivation of the SCell is generated by adding a new field to an existing DCI format.

7. An activation determination method, comprising:

receiving, by a terminal, downlink control information (DCI) sent by a base station;

determining, according to a format of the DCI, the DCI is used for indicating the terminal to perform at least one of activation or deactivation of a secondary cell (SCell);

wherein, the DCI comprises a first field used for indicating the terminal to perform at least one of activation and deactivation of the SCell;

receiving SCell grouping information, sent by the base station and obtained by grouping SCells available to the terminal, wherein the SCell grouping information comprises SCells in each SCell group;

wherein the first field comprises a first target field, a number of bits of the first target field is equal to the number of available SCell groups, the available SCell groups comprise a first target group and a second target group; and performing the at least one of activation and deactivation of the SCell according to the DCI comprises: according to the SCell grouping information and the first target field, perform at least one of: activating an SCell in the first target group, or deactivating an SCell in the second target group;

wherein the first field comprises a second target field, a number of bits of the second target field is 1, a number of groups for grouping the SCells is 2, and performing the at least one of activation and deactivation of the SCell according to the DCI comprises: activating an SCell in a first SCell group and deactivating an SCell in a second SCell group according to the second target field, or deactivating an SCell in the first SCell group and activating an SCell in the second SCell group according to the second target field.

8. The method according to claim 7, further comprising: determining, according to a radio network temporary identifier (RNTI) corresponding to the DCI, the DCI is used for indicating the terminal to perform the at least one of activation and deactivation of the SCell.

9. The method according to claim 7, wherein performing the at least one of activation and deactivation of the SCell according to the DCI comprises: performing, in response to sending a hybrid automatic repeat request-acknowledgement (HARQ-ACK) corresponding to the DCI to the base station, at least one of activation and deactivation of the SCell according to the DCI.

10. The method according to claim 7, wherein the DCI further comprises a second field used for indicating other information.

11. The method according to claim 10, wherein performing the at least one of activation and deactivation of the SCell according to the DCI comprises:

performing, in response to sending of a physical uplink shared channel (PUSCH) scheduled by the DCI or in response to sending of an HARQ-ACK corresponding to a physical downlink shared channel (PDSCH) scheduled by the DCI, the at least one of activation and deactivation of the SCell according to the DCI.

12. The method according to claim 7, wherein the SCell grouping information comprises: a number of groups for grouping the SCells.

13. The method according to claim 7, wherein the base station is configured to obtain the SCell grouping information by performing steps comprising:

determining a number of SCells available to the terminal, and grouping SCells available to the terminal when the number of SCells available to the terminal is greater than a preset number.

14. The method according to claim 7, wherein the DCI used for indicating the terminal to perform at least one of activation and deactivation of the SCell is generated by adding a new field to an existing DCI format.

15. An electronic device, characterized in comprising:

a processor; and a memory for storing instructions executable by the processor;

wherein, the processor is configured to implement the activation determination method according to claim 7.

16. An electronic device, characterized in comprising:

a processor; and a memory for storing instructions executable by the processor;

wherein, the processor is configured to:

send downlink control information (DCI) to a terminal, wherein the DCI is used for indicating the terminal to perform at least one of activation and deactivation of a secondary cell (SCell), a format of the DCI used for indicating the terminal to perform at least one of activation and deactivation of the SCell is different from a format of another DCI used for indicating other information, and the DCI comprises a first field used for indicating the terminal to perform at least one of activation and deactivation of the SCell;

obtain SCell grouping information by grouping SCells available to the terminal; and send the SCell grouping information, available to the terminal, to the terminal, wherein the SCell grouping information comprises SCells in each SCell group;

wherein the first field comprises a first target field, a number of bits of the first target field is equal to a number of available SCell groups, the available SCell groups comprise a first target group and a second target group, and the first target field is used for indicating the terminal to perform at least one of: activating an SCell in the first target group, or deactivating an SCell in the second target group;

wherein the first field comprises a second target field, a number of bits of the second target field is 1, and a number of groups for grouping the SCells is 2, and the second target field is used for indicating the terminal to activate an SCell in a first SCell group and deactivate an SCell in a second SCell group, or the second target field is used for indicating the terminal to deactivate an SCell in the first SCell group and activate an SCell in the second SCell group.

17. The electronic device according to claim 16, wherein the processor is further configured to determine a number of SCells available to the terminal, and group SCells available to the terminal when the number of SCells available to the terminal is greater than a preset number.

18. The electronic device according to claim 16, wherein the DCI used for indicating the terminal to perform at least one of activation and deactivation of the SCell is generated by adding a new field to an existing DCI format.

\* \* \* \* \*